May 15, 1962     P. DOTTER ETAL     3,034,618
COASTER HUB
Filed July 12, 1960
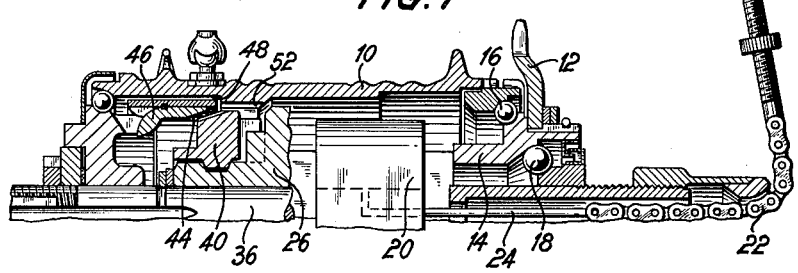
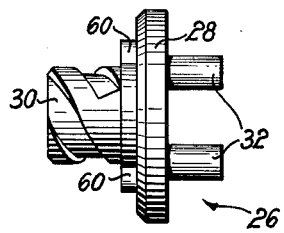 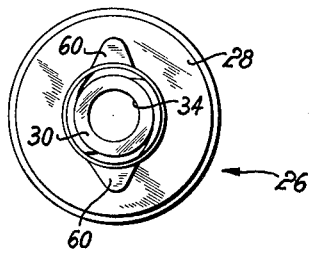
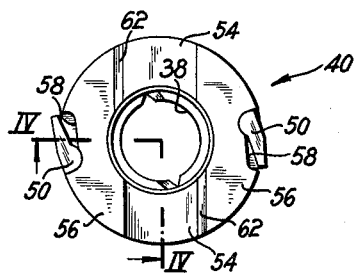 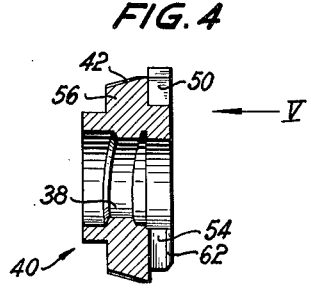
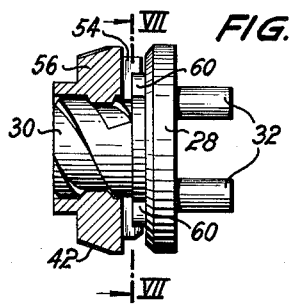 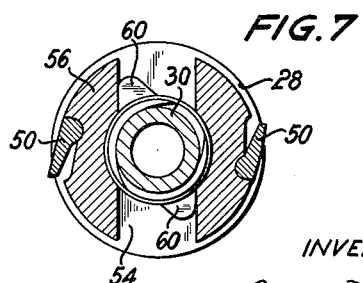
INVENTORS
Paul Dotter
Hans Joachim Schwerdhöfer
By Richard Low
Agt United States Patent Office 3,034,618
Patented May 15, 1962

3,034,618
COASTER HUB
Paul Dotter and Hans Joachim Schwerdhöfer, Schweinfurt, Germany, assignors to Fichtel & Sachs A.G., Schweinfurt (Main), Germany, a corporation of Germany
Filed July 12, 1960, Ser. No. 42,292
Claims priority, application Germany July 15, 1959
8 Claims. (Cl. 192—6)

This invention relates to bicycles, motorcycles, and like vehicles, and more particularly to an improved coaster hub for wheeled vehicles such as bicycles.

In a known type of coaster hub, the movement of pedals or of a motor is transmitted to a rotatable driving member in the hub which carries a coaxial threaded pin. The pin matingly engages an internal thread in a rotatable driven member, commonly referred to as the "brake cone." By this threaded engagement, the driving and the driven member are rotatable and simultaneously axially movable relative to each other. Means are provided for limiting the relative movement of these members so that they are constrained to rotate jointly when either end of the limited axial path is reached. The brake cone is arranged to transmit the rotary movement of the driving member to the hub shell in one of the two limiting positions, so that movement of the pedals or of the motor of the vehicle actuates rotation of the wheel and forward movement of the bicycle. When rotating in the other direction beyond the limit of relative movement of the driving and driven members, the driving member causes the brake cone to apply a brake to the wheel hub. The shift from the wheel actuating to the wheel braking function of the brake cone is achieved by the axial movement thereof from one to the other of the limiting positions.

It is apparent that serious malfunctioning of the coaster hub of the afore-described known type will result if the driven and driving members should be locked together when the direction of rotation of the driving member is reversed and axial movement away from a limiting position is intended. It is desirable that the stop arrangement which limits the relative threaded movement of the driving and the driven member be strong so as positively to interrupt the relative movement of the two members which is actuated by strong forces, and that the members readily separate again when this is desired.

These two conditions are somewhat contradictory, and positive stoppage has been found in conventional hubs to be associated with freezing of the internal mechanism. "Freezing" is particularly difficult to prevent in that limiting position in which the driving and driven members are axially adjacent each other and are stopped by mutual abutting engagement. The pitch of the threaded connection between the two members is of necessity rather fine so as to provide a substantial mechanical advantage for brake operation. The axial pressure developed between the abutting portions of the two members is very great and the probability of "freezing" in the abutting position of the two members is substantial. The solutions for this serious problem proposed so far have been either of limited effect, or they involved relatively complex mechanism expensive to manufacture and to maintain in good working condition.

It is the object of this invention to provide an improved coaster brake in which "freezing" of the driving member to the brake cone in the position of abutting engagement of the members is reliably prevented.

Another object is the provision of such a hub the mechanism of which is relatively simple, and consists of a minimum of separate elements.

Yet another object is the provision of a hub which is sturdy and capable of a long period of troublefree operation without maintenance, and still is inexpensive in original cost.

With these and other objects in view, the invention is primarily concerned with improved stop means for limiting the relative axial movement of a driving member and of a driven brake cone member in an otherwise conventional hub shell equipped with brake means. The axial movement shifts one of the members, and more specifically the brake cone member, between a position in which it transmits its rotary movement to the hub shell, and another position in which it urges the brake into engagement with the hub shell. Matingly engaged threaded portions on the driving member and on the brake cone actuate the axial movement when the two members rotate relative to each other.

The stop means of the invention includes an axially extending projection on a radially extending face portion of one of the members which is arranged opposite a corresponding face portion of the other member which has a recess with an axially and radially extending wall. When the driving and driven member threadedly move toward each other into the limiting position of abutting engagement of the stop means, the projection is received in the recess and abuts against the afore-mentioned wall in a direction which is transverse of the thread axis.

This engagement of the recess wall on one of the members by the projection on the other one in a direction at right angles to the axis of the threads is not subject to the high axial pressure developed by the mechanical advantage of the threads. By stopping rotation of the two members, the axial movement is reliably stopped. The stresses which cause freezing in the conventional arrangement described above are translated into internal stresses in the engaging stop means, particularly the projection and the recess wall which act as stop means.

It has been found that the desired mechanical strength can be imparted to the stop means by cold forming to which metallic materials of construction respond by increased tensile and shear strength. The shapes preferred for the projection and the recess moreover lend themselves particularly well to cold forming which is a relatively simple and inexpensive operation.

Other features and advantages of this invention will be readily apparent from consideration of the following detailed description of a preferred embodiment of the invention relating to the annexed drawing wherein:

FIG. 1 illustrates a coaster hub of the invention in axial section, only one half of the hub being shown. It will be understood that the other half is substantially a mirror image of the portion seen in FIG. 1;

FIG. 2 shows the driving member of the hub of FIG. 1 in side elevation;

FIG. 3 is a front-elevational view of the driving member of FIG. 2;

FIG. 4 shows the driven member of the hub of FIG. 1 in section on the line IV—IV of FIG. 5;

FIG. 5 illustrates the driven member of FIG. 4 in an end-elevational view taken in the direction of the arrow A;

FIG. 6 is a side-elevational view, partly in axial section, of the driving and driven members in the assembled condition; and FIG. 7 shows the assembly of FIG. 6 in transverse section on the line VII—VII.

Referring now to the drawing, and initially to FIG. 1, there is shown one half of a largely conventional multiple-speed coaster hub in axial section. The coasting, braking, and speed-shifting mechanism is contained within a hub shell 10 to which the wire spokes of the wheel (not shown) are attached in the customary manner. The actuating movement of pedals or of a motor (not shown) is transmitted to a sprocket 12 which is fixedly fastened to an outer drive member 14. The member 14 is rotatably supported in the shell 10 by means of ball bearings 16 and 18.

The movement of the outer drive member 14 is transmitted to a multi-speed gear transmission which occupies the space 20 and has not been shown since it is well known in itself and not necessary for an understanding of the present invention. The transmission may be of any conventional type. For the purpose of illustration it shall be assumed that its output be a planetary gear, but this is not essential to this invention.

The usual chain 22 and rigid link 24 have been shown to indicate the controls which permit the operator to change the transmission ratio of the gear drive.

A driving member 26 is actuated by the output of the multi-speed transmission. It is seen best in FIGS. 2 and 3 in side and front elevation respectively. The driving member 26 includes a disk portion 28 which is coaxial with the hub shell 10. A pin portion 30 projects axially from the disk portion. It is of generally cylindrical shape and a buttress thread is cut into its cylindrical surface. Two stub shafts 32 axially project in the opposite direction from the disk portion 28 and carry the planet wheels (not shown) of the planet gear output of the transmission 20 in the assembled hub. The driving member 26 has an axial bore 34 by means of which the driving member is slidably journaled on the stationary axle 36 of the coaster hub.

The threaded pin portion 30 of the driving member 26 engages a mating internal thread 38 of the driven brake cone member 40 the details of which are apparent from FIGS. 4 and 5 which represent axially sectional and end-elevational views of the brake cone member respectively. The driven member 40 has an external conical face 42 which cooperates with a mating internal conical face 44 of a brake drum 46 when the driven member 40 moves toward the left from the position seen in FIG. 1. The brake drum 46 is made of resilient material and is slit in an axial plane so that it is expanded by the pressure developed upon engagement of the conical faces 42 and 44, and contracts when the pressure is released. When expanded, the brake drum 46 makes contact with a friction facing 48 on the inside of the hub shell 10 so as to brake the movement of the latter relative to the stationary axle 36.

The driven brake cone member 40 carries two catches 50 one end of each of which is pivoted to the driven member at a diameter of the base of the conical portion as best seen in FIGS. 5 and 7. The free ends of the catches 50 are urged radially outward by springs which are not shown so as not to crowd the drawing. When the driven brake cone member 40 is in its terminal axial position on the right, as viewed in FIG. 1, the catches 50 engage corresponding notches in a notched annular member 52 for transmitting the rotation of the driving member 26 to the hub shell 10, and thereby to the wheel.

The frontal radial face of the driven member 40 at the base of the conical portion oppositely faces the driving member 26. The face is formed with an elongated groove 54 which longitudinally extends along a diameter of the frontal face and divides the face into two segment shaped portions which are raised relative to the bottom of the groove 54. Portions 62 of the edges of the groove 54 are beveled as best seen in FIG. 5. The groove 54 is formed by forcing a die into a suitably shaped blank at ambient temperature. The resulting metal structure of the groove walls is particularly well suited to absorb the stresses which are generated there in the normal operation of the coaster hub. The recesses 58 in the frontal face which receive the catches 50 are formed in the same manner, and may conveniently be formed in the same operation.

The frontal radial face of the disk portion 28 of the driving member 26 opposite the groove 54 has two axially projecting lugs 60 which are offset relative to the hub axis by 180°, and are arranged on opposite sides of the base of the pin portion 30. The lugs appear in FIGS. 2 and 6, and are best seen in FIGS. 3 and 7.

The afore-described hub operates as follows:

When propelling power is applied to the sprocket 12, the initial rotary movement of the driving member 26 relative to the driven brake cone member 40 causes the latter to move axially toward the right, as viewed in FIG. 1, into a position in which the driving and driven members are located closely adjacent each other and the afore-mentioned radial faces approach abutting engagement.

The width of the groove 54, the shape and size of the lugs 60, and the pitch of the thread 38 are coordinated in such a manner that the lugs 60 axially enter the groove 54 and transversely abut against the axially and radially extending side walls thereof before the radial faces actually make contact. Entry of the lugs 60 into the groove 54 is facilitated by the beveled edge portions 62. The relative axial movement of the driven member 40 and the driving member 26 is stopped short of abutting engagement of any face portions thereof which extend transversely of the hub axis and would be subject to the force applied to the sprocket 12 amplified by the mechanical advantage of the thread 38. The pressure exerted by the lugs 60 against the side walls of the recess 54 is relatively low, and "freezing" of the hub mechanism is reliably prevented.

The lugs 60 are preferably also produced by cold deformation of a blank from which the entire driven member is integrally formed.

Although the hub arrangement of the invention is superior to those known heretofore in avoiding "freezing" of the brake and power transmission mechanism, it employs a minimum number of elements and is therefore relatively inexpensive to manufacture. The preferred method of forming the interengaging stop means gives the metal those structural characteristics which are most suitable for the conditions of stress to which the stop means are exposed during normal hub operation, and thus extends the useful life of the apparatus. Because of the limited space available in the hub shell of a bicycle wheel, it is an important advantage of the hub arrangement that it utilizes the available space so as to provide a structure of great strength with a minimum of material.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed and desired to be protected by Letters Patent of the United States is:

1. In a coaster hub arrangement for a wheel of a bicycle and the like, in combination, a hub shell; brake means engageable with said hub shell; a rotary driving member and a rotary driven member in said shell, one of said members being axially movable relative to the other one of said members between a position in which said one member transmits the rotary movement thereof to said shell, and another position in which said one member urges said brake means into braking engagement with said shell; matingly engaged threaded portions on said driven and said driving member respectively for actuating axial movement of said members toward and away from each other when said members rotate relative to each other, said members having respective opposite radially extending face portions; and stop means for limiting said axial movement of said members toward each other in a predetermined relative position, said stop means including an axially extending projection on one of said face portions, the other one of said face portions being formed with a recess having an axially and radially extending wall for engagement with said projection when said members threadedly move toward each other into said predetermined position.

2. In an arrangement as set forth in claim 1, said threaded portions, said face portions, said projection and said wall being integral with the respective member.

3. In an arrangement as set forth in claim 1, said recess being radially elongated, and said projection including two lug members diametrically opposed relative to the axis of said threaded portions.

4. In a coaster hub arrangement for a wheel of a bicycle and the like, in combination, a hub shell having an axis; brake means engageable with said hub shell; a rotary driving member and a driven brake cone member rotatable about said axis in said shell, said driven member having catch means thereon and being movable axially in said shell between a position in which said catch means engage said shell for transmitting rotary movement of said driven member thereto, and another position in which said driven member urges said brake means into braking engagement with said shell; matingly engaged threaded portions on said driven and said driving member respectively for actuating axial movement of said driven member toward and away from said driving member when said driving member rotates relative to said driven member, said members having respective opposite radially extending face portions; and stop means for limiting said axial movement of said driven member toward said driving member in a predetermined position, said stop means including lug means symmetrically arranged about said axis and axially projecting from said face portion of said driving member, and said face portion of said driven member being formed with a recess having an axially and radially extending wall for engagement with said lug means when said driven member threadedly moves toward said driving member into said predetermined position.

5. In an arrangement as set forth in claim 4, said recess defining two raised sections in said face portion of said driving member, said catch means including two catch members respectively secured to said raised sections.

6. In a coaster hub arrangement for a wheel of a bicycle and the like, in combination, a hub shell; brake means engageable with said hub shell; a rotary driving member and a coaxially rotary driven member in said shell, said members having respective threaded portions engaged for relative rotation of said members about the common axis and simultaneous axial movement of said members between a first relative position of said members in which one of said members transmits the rotary movement thereof to said shell, and a second relative position in which one of said members urges said brake means into braking engagement with said shell; eccentric stop means on each of said members, said stop means being in abutting engagement when said members are in one of said relative positions thereof, and arranged to move in a circumferentially extending direction away from each other when said members move from said one relative position thereof toward the other relative position.

7. In an arrangement as set forth in claim 6, said members moving axially toward and away from each other when threadedly rotating relative to each other, and moving axially away from each other when moving from said one toward said other relative position thereof.

8. In an arrangement as set forth in claim 6, said members having respective radially extending face portions, one of said face portions being formed with a recess means having a plurality of axially extending walls; and a plurality of projections on the other one of said face portions, each projection having a wall extending in an axial direction abuttingly engageable with a respective wall of said recess means when said members are in said one position thereof, said walls constituting said stop means.

References Cited in the file of this patent
UNITED STATES PATENTS

| | | |
|---|---|---|
| 689,962 | Hammond | Dec. 31, 1901 |
| 1,283,386 | Wenzelmann | Oct. 29, 1918 |
| 1,891,576 | Poirier | Dec. 20, 1932 |
| 2,504,018 | Gibson et al. | Apr. 11, 1950 |
| 2,979,965 | Diebold | Apr. 18, 1961 |